(12) United States Patent
Tye

(10) Patent No.: US 7,229,110 B1
(45) Date of Patent: Jun. 12, 2007

(54) BOTTLE LOADING AND UNLOADING TOOL WITH EXTENDABLE ARMS

(76) Inventor: David Tye, 16311 Waikiki La., Huntington Beach, CA (US) 92649

( * ) Notice: Subject to any disclaimer, the term of this patent is extended or adjusted under 35 U.S.C. 154(b) by 132 days.

(21) Appl. No.: 10/046,066

(22) Filed: Jan. 15, 2002

(51) Int. Cl.
*B66C 1/42* (2006.01)
*B65B 21/02* (2006.01)

(52) U.S. Cl. ..................... 294/87.1; 414/736

(58) Field of Classification Search .............. 294/87.1; 414/331.01, 404, 416.03, 416.08, 416.09, 414/416.11, 736, 752.1, 753.1, 749.6
See application file for complete search history.

(56) References Cited

U.S. PATENT DOCUMENTS

| | | | | |
|---|---|---|---|---|
| 2,924,484 A | * | 2/1960 | Tolsma | 294/87.1 |
| 3,125,369 A | * | 3/1964 | Copping | 294/115 |
| 3,347,587 A | * | 10/1967 | Frost | 294/87.1 |
| 3,780,492 A | * | 12/1973 | Corderoy | 294/87.1 |
| 3,885,825 A | * | 5/1975 | Amberg et al. | 294/115 |
| 4,634,333 A | * | 1/1987 | Butterly et al. | 414/331.07 |
| 4,988,252 A | * | 1/1991 | Yamamoto et al. | 294/88 |
| 5,180,269 A | * | 1/1993 | Nishioka | 414/331.01 |
| 5,244,330 A | * | 9/1993 | Tonjes | 414/267 |
| 5,366,340 A | * | 11/1994 | Vo et al. | 294/94 |
| 5,460,461 A | * | 10/1995 | McGrath | 294/19.1 |
| 5,471,738 A | * | 12/1995 | Burcham et al. | 901/39 |
| 5,895,195 A | * | 4/1999 | Simmons et al. | 414/416.04 |
| 6,073,667 A | * | 6/2000 | Graffin | 141/372 |
| 6,371,717 B1 | * | 4/2002 | Grams et al. | 294/87.1 |

FOREIGN PATENT DOCUMENTS

EP 0534558 * 3/1993 ................ 414/331

* cited by examiner

*Primary Examiner*—Patrick Mackey
*Assistant Examiner*—Paul T. Chin
(74) *Attorney, Agent, or Firm*—Hani Z. Sayed, Esq.; Rutan & Tucker, LLP

(57) ABSTRACT

A device for grabbing bottles comprises a frame, a first set of gripping heads, shoulder pads, extendable arms, a second set of gripping heads. The frame has a first and a second parallel elongated support structure. The first set of gripping heads is mounted on the first elongated support structure. Each shoulder pad is mounted on the first elongated support structure adjacent to the first set of gripping heads. The extendable arms are mounted on the second elongated support structure. The second set of gripping heads is mounted on an end of the extendable arms.

13 Claims, 7 Drawing Sheets

FRONT ISOMETRIC VIEW

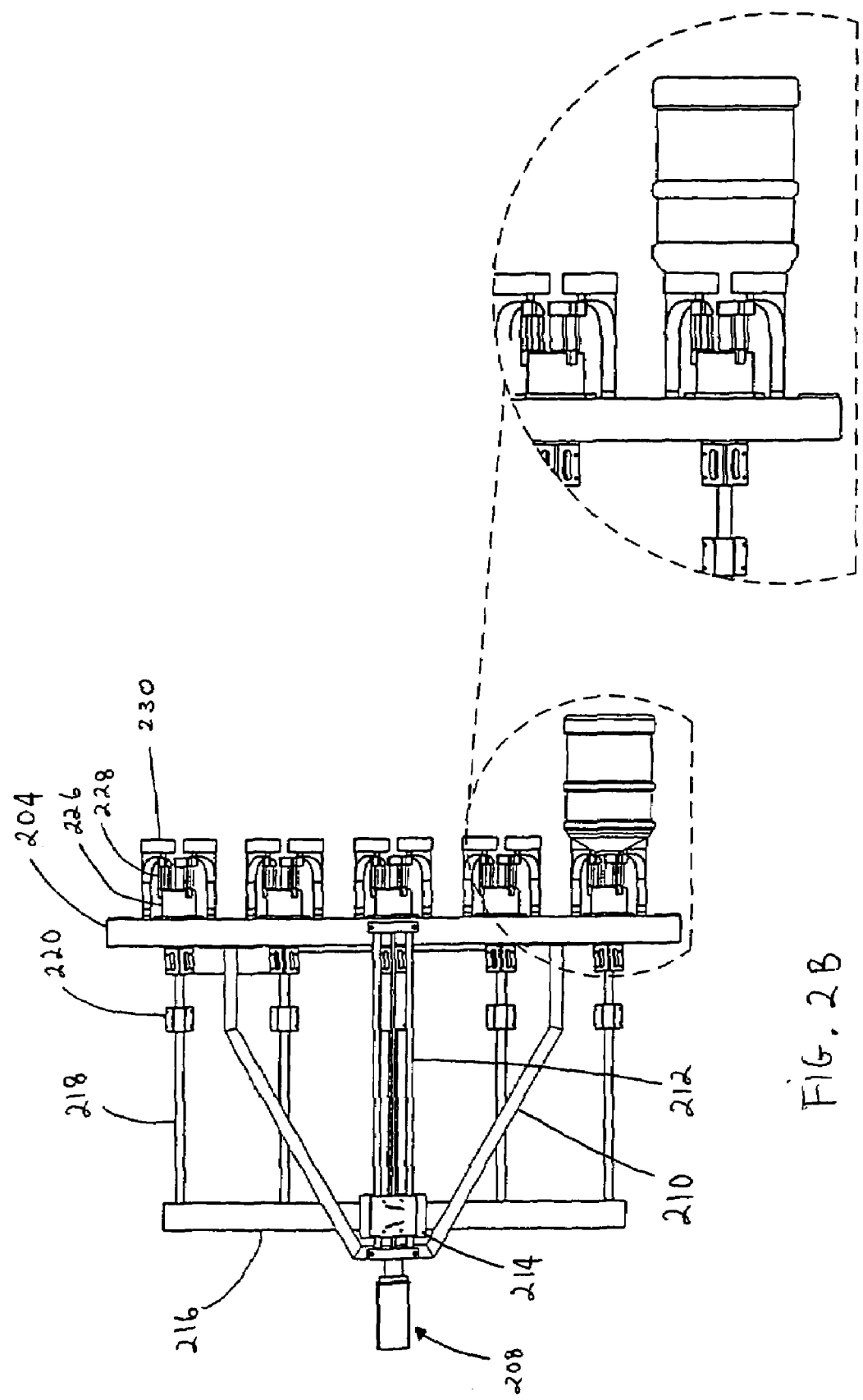

FRONT ISOMETRIC VIEW

REAR ISOMETRIC VIEW

BOTTLE LOADING AND UNLOADING TOOL WITH EXTENDABLE ARMS

FIELD OF THE INVENTION

The present invention relates to a gripping device. More particularly, the present invention relates to an automated gripping device intended for lifting and carrying large water bottles to and from support structures.

BACKGROUND OF THE INVENTION

Polycarbonate containers are commonly used to store and distribute water. Many bottles having necks, but no handles, are difficult to lift or remove from a support structure. This is especially true for large water bottles, such as the 5-gallon variety delivered to home and office.

Due to their weight and awkward size of such bottles, gripping devices are used to load and unload large water bottles to and from crates. Such bottle gripping devices may, for example, be incorporated in machines for lifting returned bottles from crates arriving at a bottling site, and for placing filled bottles into crates to be distributed from the bottling site. Normally, several bottle-gripping devices, corresponding in number to the number of bottles in a crate, are mutually coupled to form the tool at the end of a robot arm. The crate comprises several cells in which bottles are placed horizontally. This horizontal position facilitates movement and storage of the bottles.

Prior art attempts to provide an automated system using a robot arm for loading and unloading bottles in a trip. For example, FIG. 1 illustrates a first robot 102 unloading bottles from cells of a bottle rack 104. The first robot 102 receives an empty bottle 105 from a cell of the bottle rack 104. After the first robot 102 unloads the empty bottle 105, it is ready to receive another empty bottle 106 located inside the bottle rack 104. A second robot 108 is positioned behind rack 104. The second robot 108 extends an arm 110 pushing empty bottle 106 out of rack 104 so that first robot 102 is able to receive empty bottle 106.

However, both robots 102 and 108 must be synchronized in order to efficiently load and unload bottles from the rack 104. Furthermore, when the second robot 108 pushes empty bottle 106 out of the crate 104 towards the first robot 102, the empty bottle 106 may get jammed in the cells causing damages and delay to the operation.

A definite need exists for an automated gripping device. Specifically, a need exists for an automated gripping device for lifting and carrying water bottles to and from support structures. A primary purpose of the present invention is to solve these needs and provide further, related advantages.

BRIEF DESCRIPTION OF THE INVENTION

A device for grabbing bottles comprises a frame, a first set of gripping heads, shoulder pads, extendable arms, a second set of gripping heads. The frame has a first and a second parallel elongated support structure. The first set of gripping heads is mounted on the first elongated support structure. Each shoulder pad is mounted on the first elongated support structure adjacent to the first set of gripping heads. The extendable arms are mounted on the second elongated support structure. The second set of gripping heads is mounted on an end of the extendable arms.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 2B is a side view of a gripping for a robot arm according to specific aspects of the present invention.

DETAILED DESCRIPTION OF THE INVENTION

Figure 1:
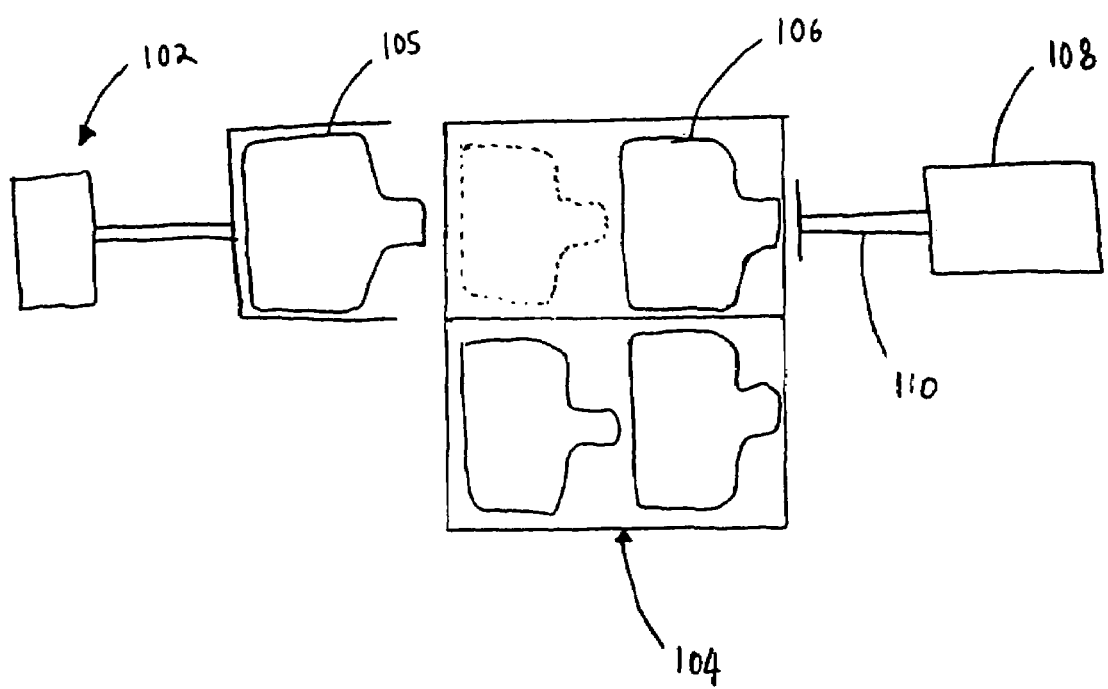
FIG. 1 is a schematic diagram of a prior art bottling robot arm.

Embodiments of the present invention are described herein in the context of a bottling tool for a robot arm. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

With respect to FIGS. 2A, 2B, 2C, 2D, a frame 202 comprises beams 204 coupled with one another, the end of each beam connecting with the end of another beam with plates 206. A handle 208 is mounted to frame 202. The axis of the handle 208 is normal to the plane of the frame 202. Two support beams 210 flanked on either sides of handle 208 provide additional support to handle 208. Both support beams 210 are mounted on the frame 202 and are connected to the handle 208. A set of rods 212 normal to the plane of frame 202 is centrally positioned between support beams 210. Set of rods 212 allows a slider 214 to slide on set of rods 212. A beam 216 is mounted transversely on slider 214 so that the direction of beam 216 is parallel to the plane of frame 202. Several evenly spaced rods 218 are mounted perpendicularly on beam 216 so that the direction of rods 218 is normal to the plane of frame 204. In particular, each rod 218 is coupled to the beam 216 at one end of each rod 218. The number of rods 218 corresponds to the maximum capacity of the tool. Each rod 218 may be capable of supporting one empty bottle.

Rods 218 slide through guides 220 which are mounted on frame 204 to provide support and direction to rods 218. The end of each rod 218 opposite to beam 216 is attached to a drive 222 coupled to a claw 224. The drive 222 may be powered with any conventional manner: electrical, hydraulic, and pneumatic. Claw 224 comprises of three complementary circular pieces accommodated to receive the neck of a bottle. Drive 222 allows claw 224 to tighten and secure the neck of the bottle. A pressure sensor 225 coupled to claw 224 may sense the amount of force or pressure applied to the claw 224. A bottle full of water or fluids may overload and stress rods 218 when the bottle is grabbed by the neck with claw 224. Claws 224 are mainly designed for grabbing and holding empty bottles.

A second series of drives 226 each coupled to claws 228 is mounted on frame 204 each adjacent to claw 224. Both series of claws 228 and 224 form two rows within frame 204. A shoulder pad 230 comprising two semi-circles surrounds each claws 228. Shoulder pad 230 is mounted on frame 204 with a support 232. Shoulder pads 230 are positioned to receive the "shoulder" of a conventional large water bottle. Shoulder pads 230 also provide support to filled bottles.

Figure 3:
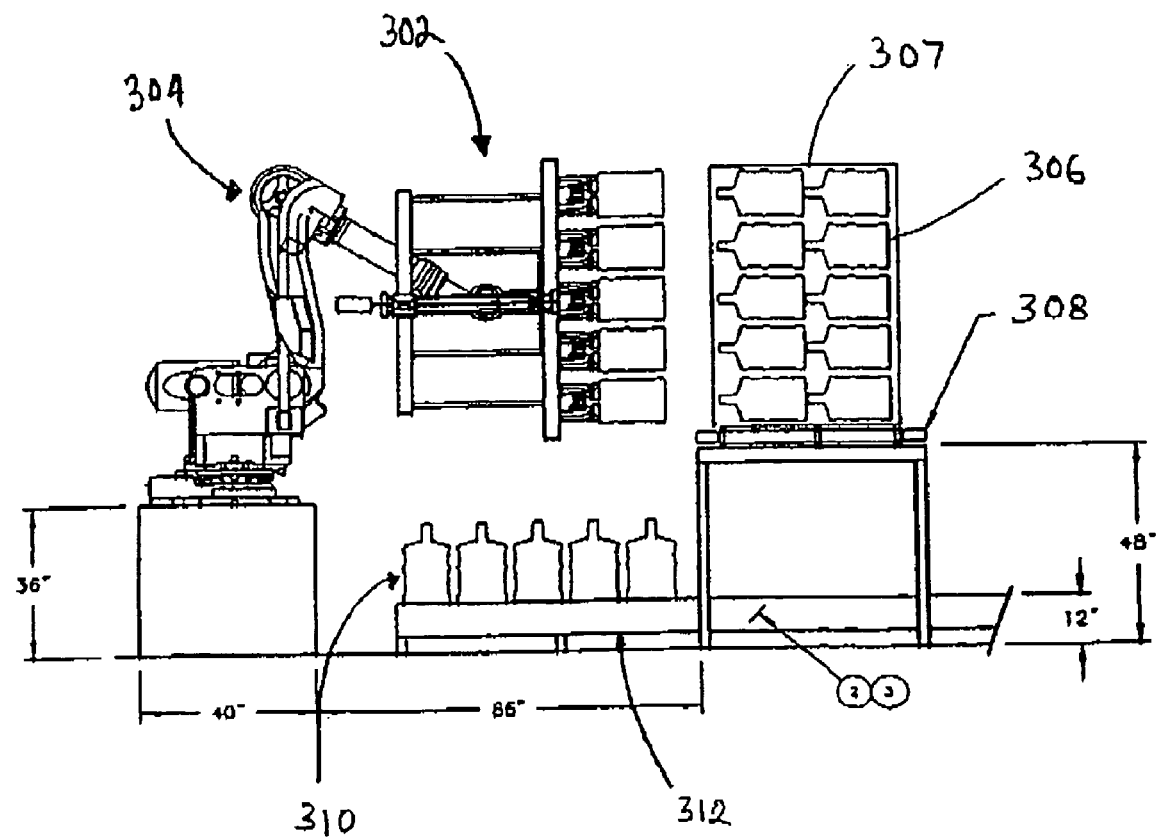
FIG. 3 is a side view of an example of a system having a gripping device on a robot arm used in a bottling operation according to specific aspects of the present invention.

FIG. 3 is a side view of an example of a tool on a robot arm used in a bottling operation according to specific aspects of the present invention. Tool 302 is mounted on a robot arm 304. Empty bottles 306 are located in a rack 307 on a first platform 308. Full bottles 310 are located on a second platform 312. First platform 308 is higher than second platform 312. The robot arm uses tool 302 to unload empty bottles 306 on support 312 while simultaneously loading full bottles 310 in the rack on support 308. For each trip the robot arm makes from platform 308 to 310 or 310 to 308, full bottles 310 are loaded in the rack and empty bottles 306 are unloaded on platform 312.

When tool 302 is positioned towards rack 307, the second series of claws with shoulder pad supporting full bottles unloads the full bottles into an empty row of rack 307. While tool 302 positions its second series of claws with full bottles towards rack 307, the first series of claws each connected to a rod and adjacent to the second series of claws, reaches in rack 307 to grab empty bottles.

Tool 302 then returns to platform 312 to unload the empty bottles by releasing the first series of claws. While tool 302 is unloading empty bottles, the second series of claws grab full bottles by tightening its claws.

Rack 307 may typically has two rows and five cells in each row. Each cell can accommodate up to two bottles. The total amount of bottles rack 307 can carry is 20 bottles. However, the tool 302 may be modified to accommodate other types of crates that may comprise of other numbers of cells and rows.

Figure 2A:
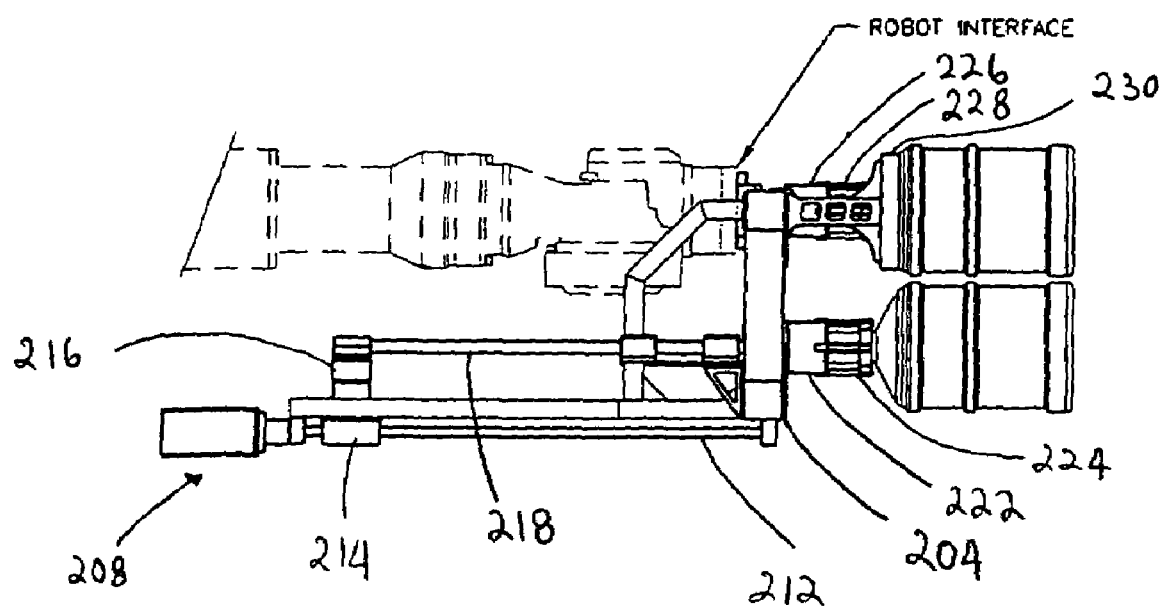
FIG. 2A is a top view of a gripping device for a robot arm according to specific aspects of the present invention.
Figure 2C:
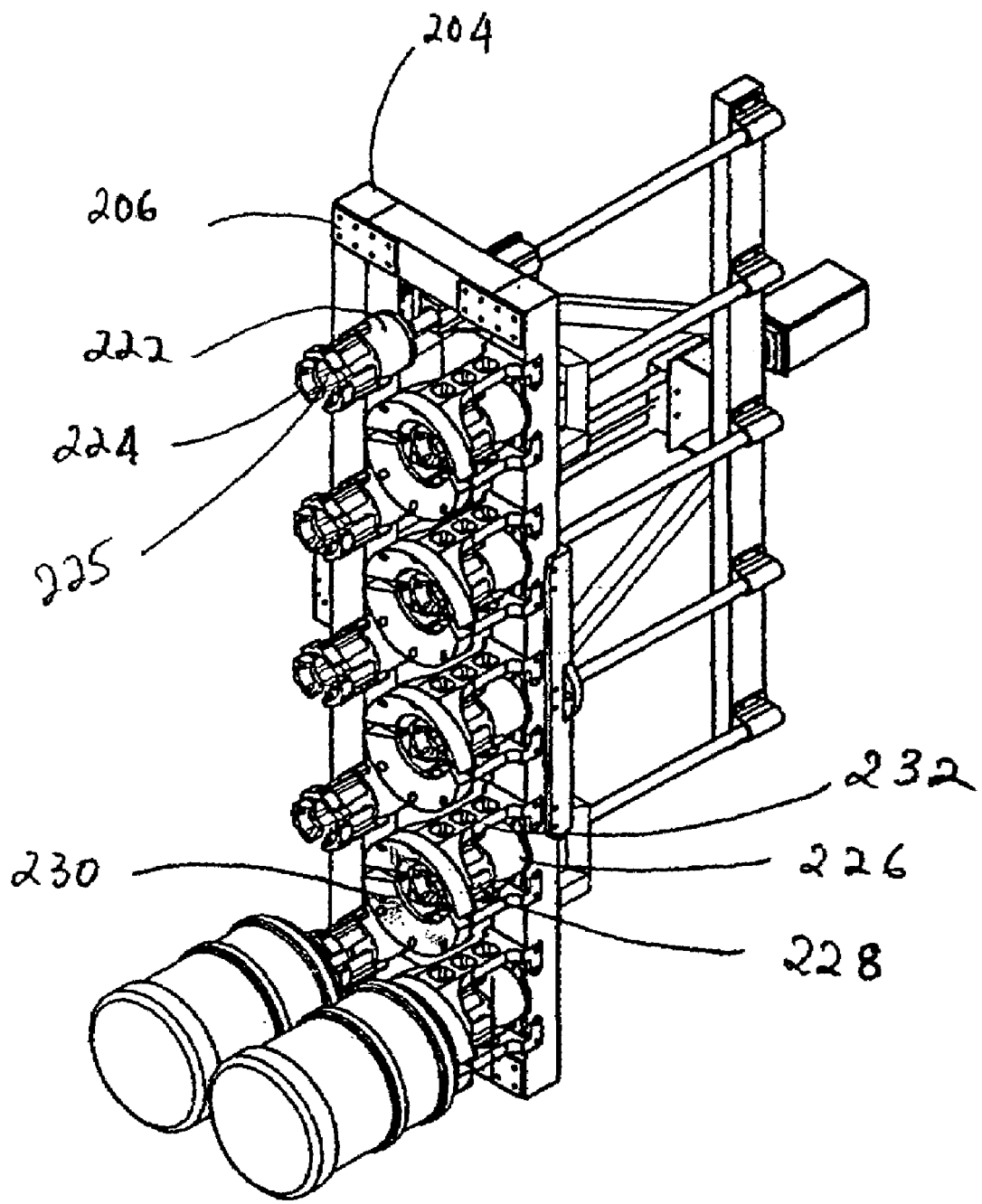
FIG. 2C is a front perspective view of a gripping device for a robot arm according to specific aspects of the present invention.
Figure 2D:
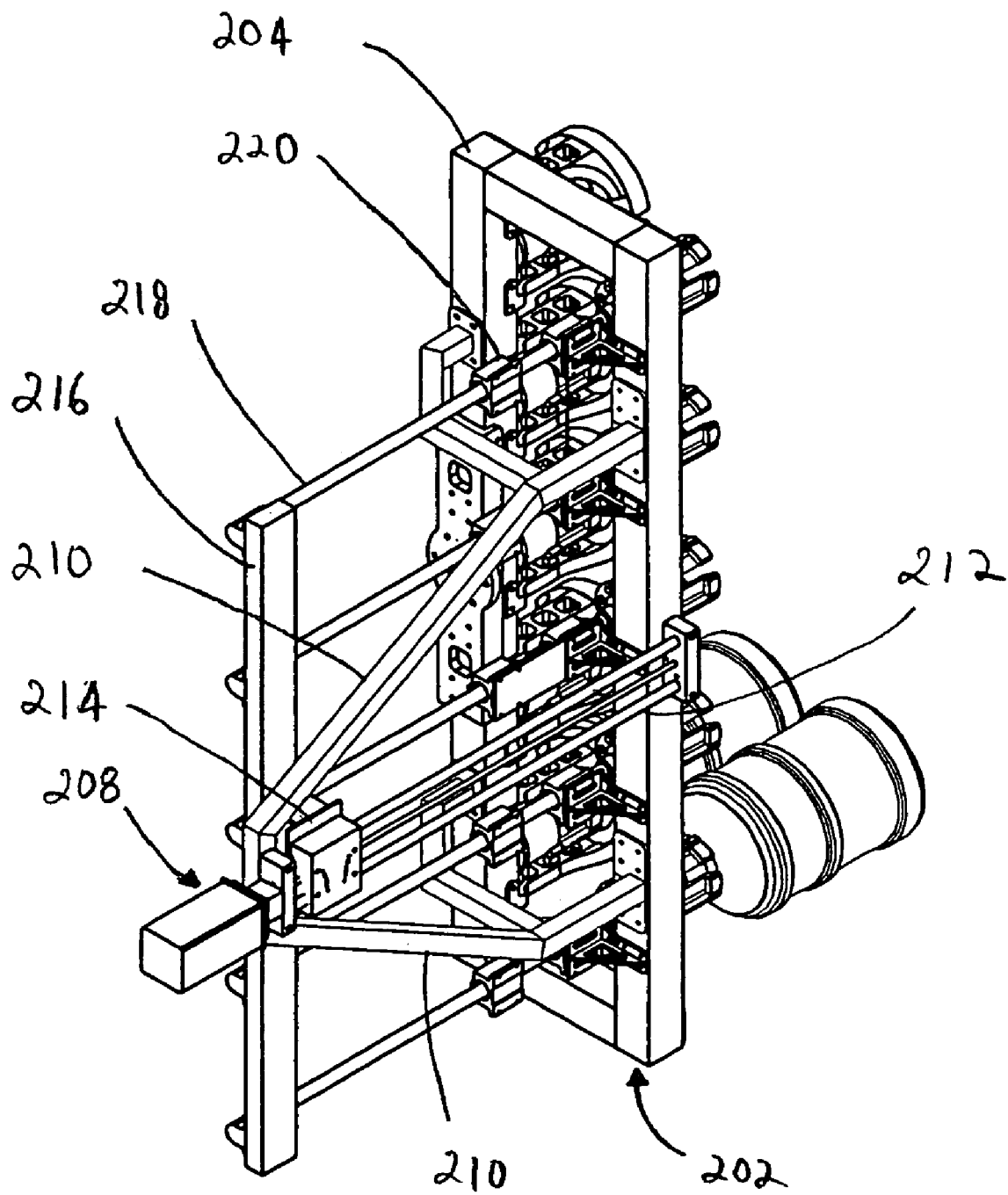
FIG. 2D is a rear perspective view of a gripping device for a robot arm according to specific aspects of the present invention.

When tool 302 needs to reach rear bottles located in the rear of rack 307, slider 214 of FIG. 2D moves along rods 212 towards rack 307 allowing rods to penetrate each cell. Claws ending the rods comes into contact with rear bottles allowing tool 302 to grab and unload empty bottles off rack 307.

Figure 4:
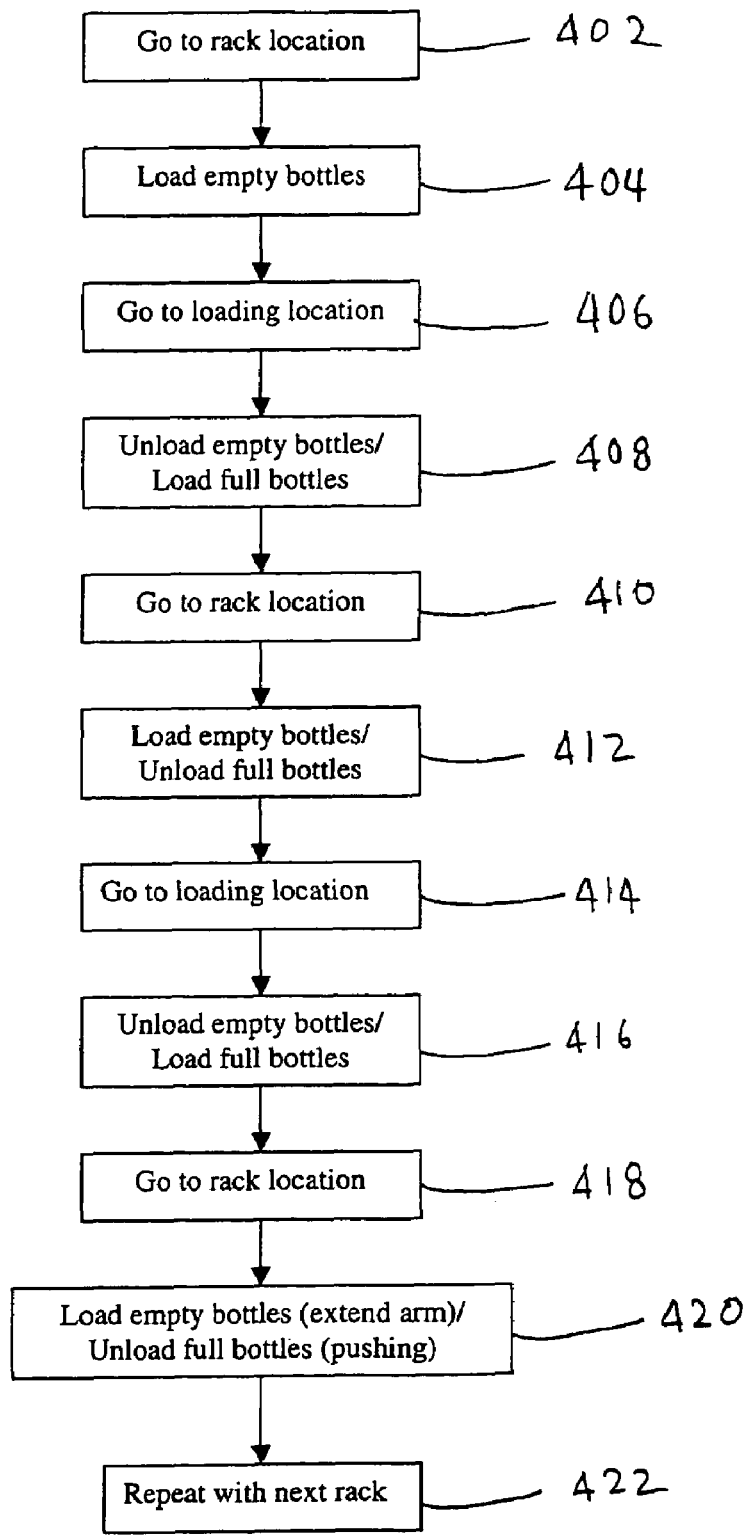
FIG. 4 is a flow diagram of an operation of a gripping device for a robot arm according to specific aspects of the present invention.

FIG. 4 is a flow chart of how a tool for a robot arm used in a bottling operation operates according to specific aspects of the present invention. This operation is illustrative only, the tool can either start loading empty bottles at a rack location or loading full bottles at a loading location. Also, the tool can be used to either load full or empty bottles into the rack. In FIG. 4, the rack location means the location of a rack containing empty bottles as illustrated by rack 307 of FIG. 3. The loading location is illustrated by platform 312 of FIG. 3.

In a first block 402, the tool reaches the rack location. Once in front of the rack, the tool loads empty bottles from the rack in block 404. The process of loading the empty bottles onto the tool is explained and illustrated in FIG. 2. Because of the starting process, no full bottles are loaded into the rack since the tool has not yet picked up the full bottles. In block 406, the tool is brought to the loading location carrying the empty bottles. In block 408, the tool unloads the empty bottles onto loading location while loading full bottles from the loading location. It is noted that the tool loads the full bottles using claws having shoulder pads surrounding the claws as illustrated in FIG. 2. Once the full bottles are loaded in block 408, the tool is then brought back to the rack location in block 410. The full bottles are then unloaded into the rack, while empty bottles are loaded onto the tool in block 412. These empty bottles are brought back to the loading location in block 414. Block 416 is similar to block 408 where the tool unloads empty bottles while full bottles are loaded into the rack. The tool is then brought back again to rack location in block 418.

Block 420 is similar to block 412 however it is noted that when the carried full bottles are loaded into the rack, the tool actually loads the full bottles into the rack by pushing the previously loaded bottles in the rack since each cell can accommodate two bottles. The tool has to use its arm extension as illustrated in FIG. 2, to reach the back end of the cells of the rack and grab the empty bottles. The tool then retracts its extension arm to its default position (retracted) so that tool can then repeat the process and unload the empty bottles while loading the full bottles at the loading location. In block 422, the robot arm repeats the process with a new rack full of empty bottles.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A device for unloading a rack storing containers, wherein:

the rack has a front space storing a first front container and a rear space storing a second rearwardly positioned container;

the device comprises a robotic arm coupled to a frame having first and second gripping heads capable of gripping the neck of the first front positioned container and the second rearwardly positioned container;

wherein the first gripping head is capable of displacement from a proximal position to a distal position relative to the frame to reach through the front space into the rear space for gripping the rear container and further wherein the second gripping head remains stationary in spatial relation to the frame, during all phases of operation; and a shoulder support structure coupled to the second gripping head for contacting a shoulder portion of the first front positioned and second rearwardly positioned containers to support a weight of the containers while the container is being gripped by the second gripping head.

2. The device of claim 1, wherein the first gripping head is disposed on a distal end of a sliding rod, and wherein a movement of the sliding rod in a distal direction displaces the first gripping head from the proximal position to the distal position.

3. The device of claim 2 further comprising a pressure sensor disposed on the first gripping head, capable of sensing pressure applied to the first gripping head by a weight of the container so as to prevent overstressing the sliding rod when the first gripping head is displaced in the distal direction at the distal position.

4. The device of claim 3 further comprising claws disposed on the first and second gripping heads for gripping the neck of containers.

5. The device of claim 4, wherein the shoulder support structure of the second gripping head is configured such that the shoulder support structure is in direct contact with a substantial area of the shoulder portion of the container.

6. The device of claim 4, wherein the shoulder support structure of the second gripping head is configured such that the shoulder support structure is in direct contact with an area that is at least 50% of the shoulder portion of the container.

7. The device of claim 3, wherein a distance between the first and second gripping heads changes as the first gripping head is displaced from the proximal position to the distal position.

8. The device of claim 1, wherein the robotic arm is capable of displacing the frame from a first location where the rack is, to a second location away from the first location, wherein the second location comprises full bottles to be loaded unto the rack.

9. The device of claim 1, wherein the containers are conventional 5-gallon water bottles.

10. A device for grabbing bottle comprising:

a robotic arm coupled to a frame;

a first gripping head with claws coupled to a sliding rod;

a second gripping head with claws and further wherein the second gripping head remains stationary in spatial relation to the frame, during all phases of operation;

wherein the first and second gripping heads are coupled to the frame;

wherein the first gripping head is capable of movement along a longitudinal axis of the sliding rod in a distal direction; and wherein the second gripping head has shoulder support structure for contacting a shoulder portion of the bottle to support a weight of the bottle while the bottle is being gripped.

11. The device of claim 10 further comprising pressure sensor coupled to the claws of the first gripping head for sensing pressure applied to the claws by a weight of the bottle so as to alert an user when the sliding rod is overstressed.

12. The device of claim 11, wherein the shoulder support structure has a concave contact surface for contacting the shoulder portion.

13. The device of claim 10 further comprising a drive coupled to the claws of the first and second gripping heads for tightening the claws to secure around a neck portion of the bottles wherein the drive is driven by at least one of electric force, hydraulic force, and pneumatic force.

* * * * *